(12) United States Patent
Au

(10) Patent No.: US 7,864,042 B2
(45) Date of Patent: Jan. 4, 2011

(54) DAILY LIFE ENGAGEMENT TIME MONITORING METHOD AND DEVICE

(76) Inventor: Sze Ho Samuel Au, Flat D, 10th Floor, Block 1, Parc Palais, 18 Wylie Road, King's Park, Kowloon (HK)

( * ) Notice: Subject to any disclaimer, the term of this patent is extended or adjusted under 35 U.S.C. 154(b) by 259 days.

(21) Appl. No.: 12/146,435

(22) Filed: Jun. 25, 2008

(65) Prior Publication Data

US 2009/0051527 A1   Feb. 26, 2009

(51) Int. Cl.
G08B 1/08   (2006.01)
(52) U.S. Cl. .............. 340/539.11; 340/539.23; 340/572.1; 340/573.1; 340/309.16; 340/10.1; 340/10.3
(58) Field of Classification Search ........... 340/539.11, 340/539.23, 309.16, 309.8, 572.1, 572.4, 340/573.1, 825.69, 825.72, 10.1, 10.3; 235/375, 235/376, 383
See application file for complete search history.

(56) References Cited

U.S. PATENT DOCUMENTS 7,710,242 B2 *   5/2010   Yamada et al. ........... 340/10.51

FOREIGN PATENT DOCUMENTS

| CN | 1568474 A | 1/2005 |
|---|---|---|
| CN | 2911799 Y | 6/2007 |
| FR | 2862794 A1 | 5/2005 |
| JP | 2003-216994 A | 7/2003 |
| JP | 2004-318646 A | 11/2004 |
| JP | 2005-141530 A | 6/2005 |
| JP | 2005-293112 A | 10/2005 |

OTHER PUBLICATIONS

International Search Report and Written Opinion of PCT/CN2008/071429.

* cited by examiner

Primary Examiner—Hung T. Nguyen

(57) ABSTRACT

The method for monitoring engagement time in daily life includes receiving a first radio frequency signal from a first signal source containing a first identification information of the first signal source; matching the first identification information with pre-defined identification information; storing in-time of the said first radio frequency signal with respect to the first identification information; checking the existence of the first radio frequency signal; storing the out-time when the first radio frequency signal is out of range. The engagement time duration between the in-time and the out-time with respect to the first identification information can be computed.

39 Claims, 6 Drawing Sheets

DAILY LIFE ENGAGEMENT TIME MONITORING METHOD AND DEVICE

CROSS-REFERENCE OF RELATED APPLICATION

The present patent application claims priority of Chinese patent application no. 200720055818.9 filed on Aug. 21, 2007.

FIELD OF THE INVENTION

The present invention relates to a device for monitoring engagement time, in particular, for tracking the time spent with spouses, relatives, friends or pets.

BACKGROUND OF THE INVENTION

People usually use organizers or electronic schedules to record the appointments with spouses, relatives, and friends. However, unless one go through the trouble to deliberately record the time duration for each encounter or event, it is difficult to know the exact time duration spent or engaged with another party, at a particular venue, or for specific purposes. It will be more convenient to organize our daily lives if the data relating to the time we spend with particular individuals, at certain venues, or for specific purposes can be collected and analyzed. To name a few examples, it will be useful for a parent to know whether he or she is spending more time with the elder or the younger sibling, or for a sales person to know how much time he or she spends with each client. For managing our daily lives, we may find out whether we have spent too much time in the office, enough time in the gym, or too much time in grocery shopping.

RFID (radio frequency identification information) technology has been applied in inventory tracking and management. RFID is used for quick identification information of goods and recording its whereabouts at a specific time. However, it has not been used to log the engagement time duration in daily lives and in a social sense. The present invention applies RFID to facilitate a new method for us to manage our social lives by conveniently recording the time duration when the two parties engage with each other, or when a party is engaged with a venue or for specific purpose.

It is an objective of the present invention to provide a convenient way to monitor the engagement time in daily lives.

SUMMARY OF THE INVENTION

The method for monitoring engagement time in daily life includes:
  receiving a first radio frequency signal from a first signal source containing a first identification information of the first signal source;
  matching the first identification information with pre-defined identification information;
  storing in-time of the said first radio frequency signal with respect to the first identification information;
  checking the existence of the first radio frequency signal;
  storing the out-time when the first radio frequency signal is out of range.

The engagement time duration between the in-time and the out-time with respect to the first identification information can be computed.

In one aspect of the present invention, the method further includes:

transmitting a second radio frequency signal containing a second identification information from a second signal source;
  receiving the second radio frequency signal by the first signal source;
  matching the second identification information with pre-defined identification information;
  storing in-time of the said second radio frequency signal with respect to the second identification information;
  checking the existence of the second radio frequency signal;
  storing the out-time when the second radio frequency signal is out of range.

In another aspect of the present invention, the present invention is a device for monitoring engagement time in daily life. The device includes:
  a radio frequency transceiver adapted to receive from a first signal source a first radio frequency signal containing a first identification information of the first signal source;
  a processing unit adapted to read the first identification information and match the first identification information with pre-defined identification information;
  a time means for providing the time to be stored;
  a power source;
  a memory means adapted to store the in-time with respect to the first radio frequency signal and the first identification information when the RFID transceiver receives the said first radio frequency signal, and the out-time with respect to the first identification information when the RFID transceiver no longer receives the first radio frequency signal; and
  a connecting means for connecting to an external processing unit for transferring data between the time recording device and the external processing unit.

In another aspect of the present invention, the method for monitoring engagement time in daily life includes:
  receiving a first radio frequency signal from a first signal source containing a first identification information of the first signal source;
  matching the first identification information with pre-defined identification information;
  timing the engagement time duration between when the receiving of the said first radio frequency signal starts and the when the first radio frequency signal is no longer received;
  storing the engagement time duration with respect to the first identification information.

In yet another aspect of the present invention, the method further includes:
  transmitting a second radio frequency signal containing a second identification information from a second signal source;
  receiving the second radio frequency signal by the first signal source;
  matching the second identification information with pre-defined identification information;
  timing the engagement time duration between when the receiving of the second radio frequency starts and when the second radio frequency signal is no longer received;
  storing the engagement time duration with respect to the second identification information.

In yet another aspect of the present invention, the present invention is a device for monitoring engagement time in daily life. The device includes:
  a radio frequency transceiver adapted to receive from a first signal source a first radio frequency signal containing a first identification information of the first signal source;

a processing unit adapted to read the first identification information and match the first identification information with pre-defined identification information;

a timing means for measuring the engagement time duration between the radio frequency transceiver starts receiving the said first radio frequency signal and the radio frequency transceiver no longer receives the first radio frequency signal;

a power source;

a memory means adapted to store the engagement time duration with respect to the first identification information; and a connecting means for connecting to an external processing unit for transferring data between the said device and the external processing unit.

An advantage of the present invention is that the data of the daily life engagement time between two parties can be easily recorded and monitored. The user can use such data for better managing his or her social lives.

BRIEF DESCRIPTION OF THE DRAWINGS

The above and other aspects, features, and advantages of the present invention will become more apparent upon consideration of the following detailed description of preferred embodiments, taken in conjunction with the accompanying figures, wherein.

DESCRIPTION OF PREFERRED EMBODIMENTS OF THE INVENTION

Figure 1:
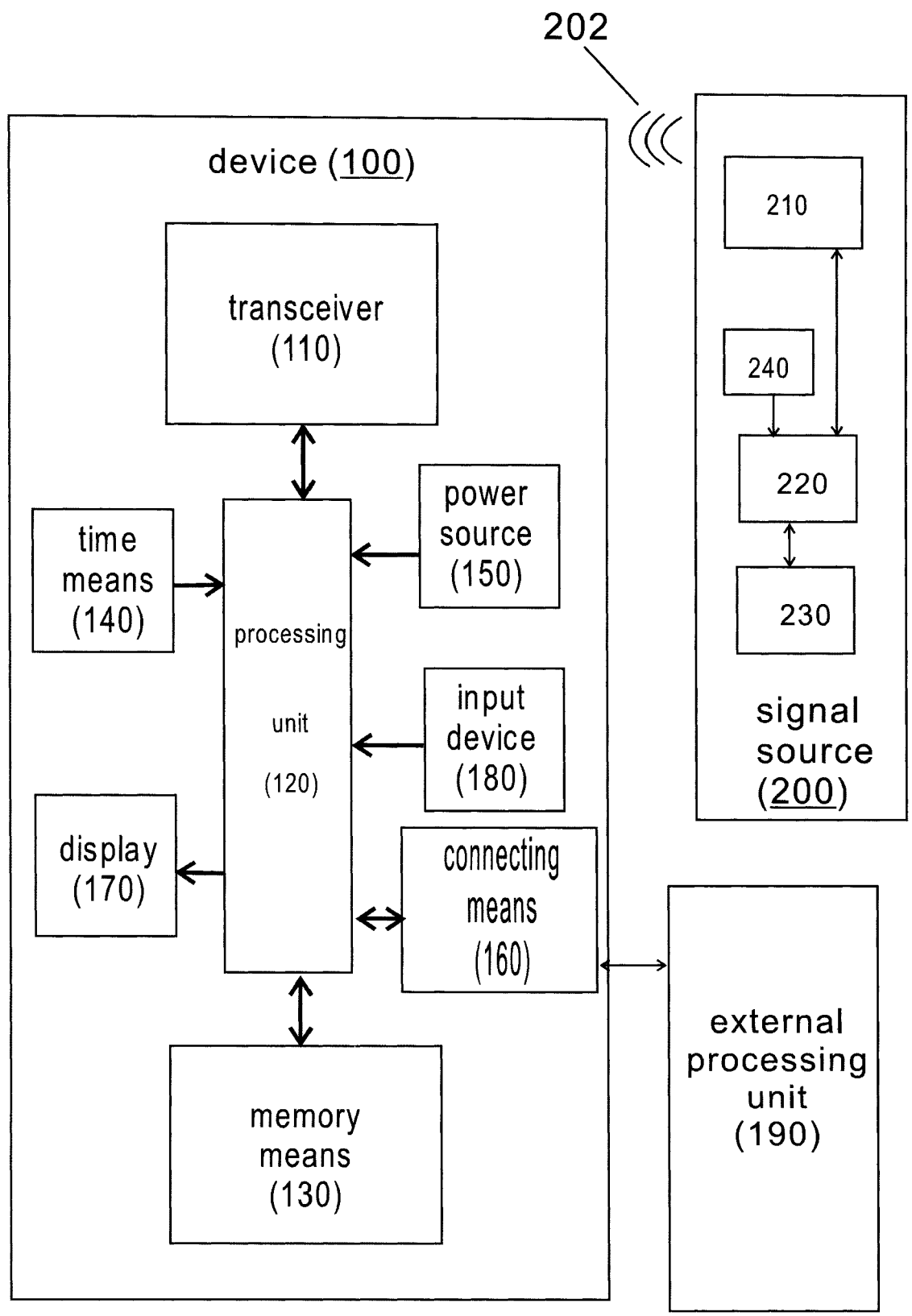
FIG. 1 illustrates an embodiment of the device of the present invention.
Figure 2A:
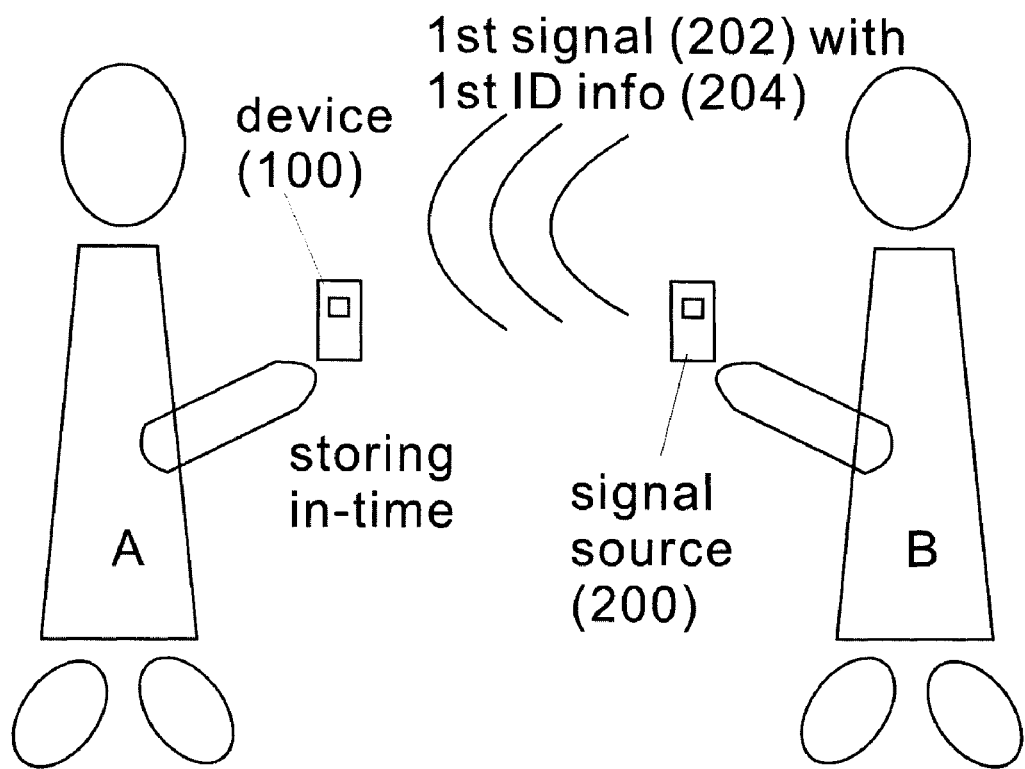
FIGS. 2a and 2b illustrate the operation of the device of FIG. 1.
Figure 2B:
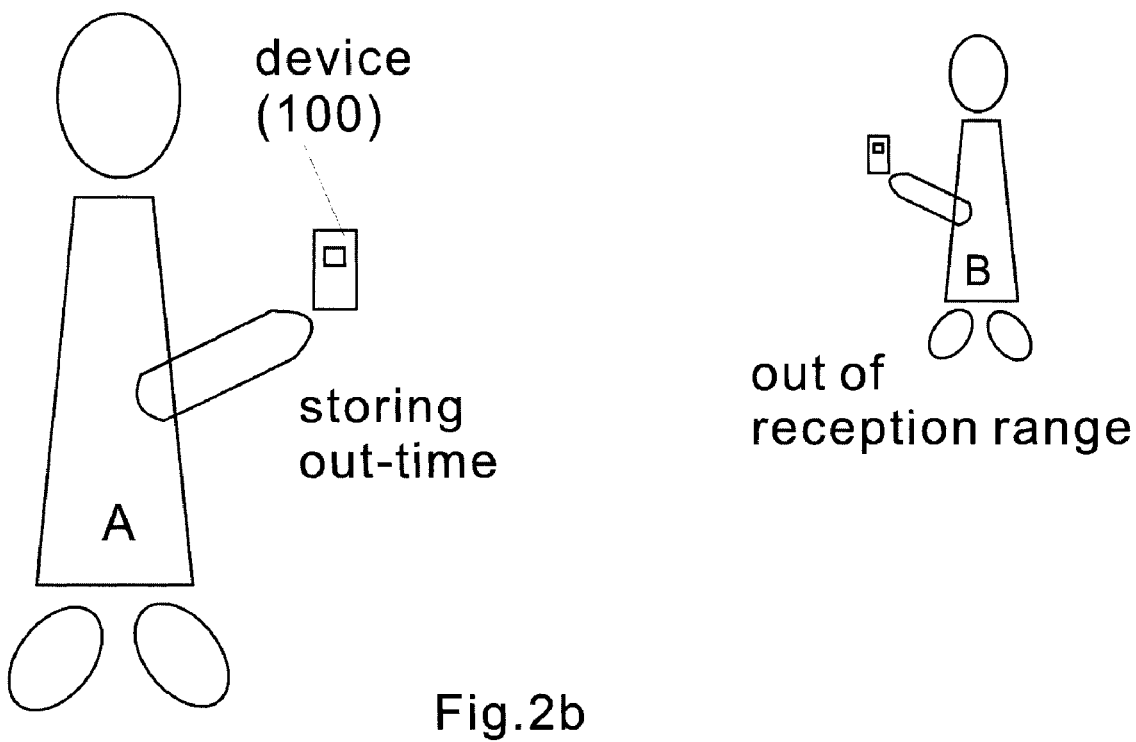

FIG. 1 shows a preferred embodiment of the device 100 for monitoring the engagement time between two parties, party A and party B. In this embodiment, the device 100 is carried by party A. Party B may be another person with whom party A wants to monitor the engagement time (as shown in FIGS. 2a and 2b), or party B may be a venue in where party A wants to know the time spent. A signal source 200 is carried by or installed at party B.

The device 100 of party A includes a radio frequency (RF) transceiver 110. A RF transceiver generally includes a circuit having a transmitter and a receiver of RF signals. The transmitter and the receiver usually share an antenna for transmitting and receiving RF signals. The RF transceiver 110 receives RF signals from the environment. When party A comes within the reception range of the RF signal from the signal source 200 of party B, for example, 3 meter, the RF transceiver 110 starts to receive a first signal 202 transmitted from the signal source 200. The first signal 202 contains a first identification information 204, which identifies the specific identity of the signal source 200. The identification information may be, for example, an alphanumerical code readable by a processing unit.

The RF transceiver 110 is connected to a processing unit 120 which reads and matches the first identification information 204 with pre-defined identification information contained in a memory means 130 connected to the processing unit 120. By way of non-limiting example, the memory means 130 may be any kind of writable electrical memory such as flash memory or RAM, or writable magnetic memory.

The pre-defined identification information is input by party A to the memory means 130 for identifying the specific parties with which party A would monitor the engagement time. Once a match is found, the time is automatically stored as the in-time. The processing unit 120 is programmed to store the in-time provided by a time means 140 with respect to the first signal 202 and the identification information 204 in the memory means 130.

The time means 140 may be a circuit contained in the processing unit 120, or may be connected to the processing unit 120, for example, as a separate circuit or a digital clock device. To save the power consumption, the processing unit 120 is programmed to read and match the identification information regularly upon a pre-defined time interval, for example, every 300 millisecond.

When party B is out of the radio frequency range, the RF transceiver 110 stops receiving the first signal 202. The moment the processing unit 120 no longer reads the first identification information 204, the time is stored as the out-time. The processing unit 120 is programmed to store the out-time provided by the time means 140 with respect to the first signal 202 and the identification information 204 in the memory means 130. By recording the in-time and out-time with respect to the identification information, the time duration engaged by party A with party B can be computed and monitored.

If party A has engaged with party B before and the relevant time data has been stored in the memory means, the processing unit 120 may be programmed to add an increment of the newly engaged time to the stored time data.

The device 100 further includes a power source 150 for providing power to the components of the device 100, for example, the processing unit 120, the time means 140 and the memory means 130. The power source 150 may be a battery, rechargeable battery or USB chargeable battery.

A connecting means 160, for example, a USB port or a blue tooth communication unit, is provided on the device 100 for downloading the time data from the memory means 130 to an external processing unit 190, for example, a computer or a PDA for further manipulation. A USB port may be preferred to be used as the connecting means 160 as it is convenient to transfer the time data from the device 100 to the computer, to synchronize the time means 140, and to recharge the power source 150 via the USB port. The connection may also be via Wifi, Zigbee, RF or Infrared.

In another embodiment, a display 170, for example LED display, OLED display, or LCD display may be provided on the device 100 for the user to view information such as the real time, the time spent in engagement, the name of party B, the name of venue (if party B is a venue) or the name of the event (certain parties may be grouped to be represented by an event, for example, grocery shops may be grouped under the event of "shopping"). The display 170 may also give more sophisticated information processed by the processing unit 120, for example, the total time party A spent with party B in the last week, month or during the last 24 hours, or the average time party A spent with party B per week, month or year. An input device 180, for example, a keypad or buttons will be provided on the device 100 for sending instruction to the processing unit 120 to process and display such information.

The device 100 may be designed as a small portable device easy to be carried around by party A in daily life.

Figure 3A:
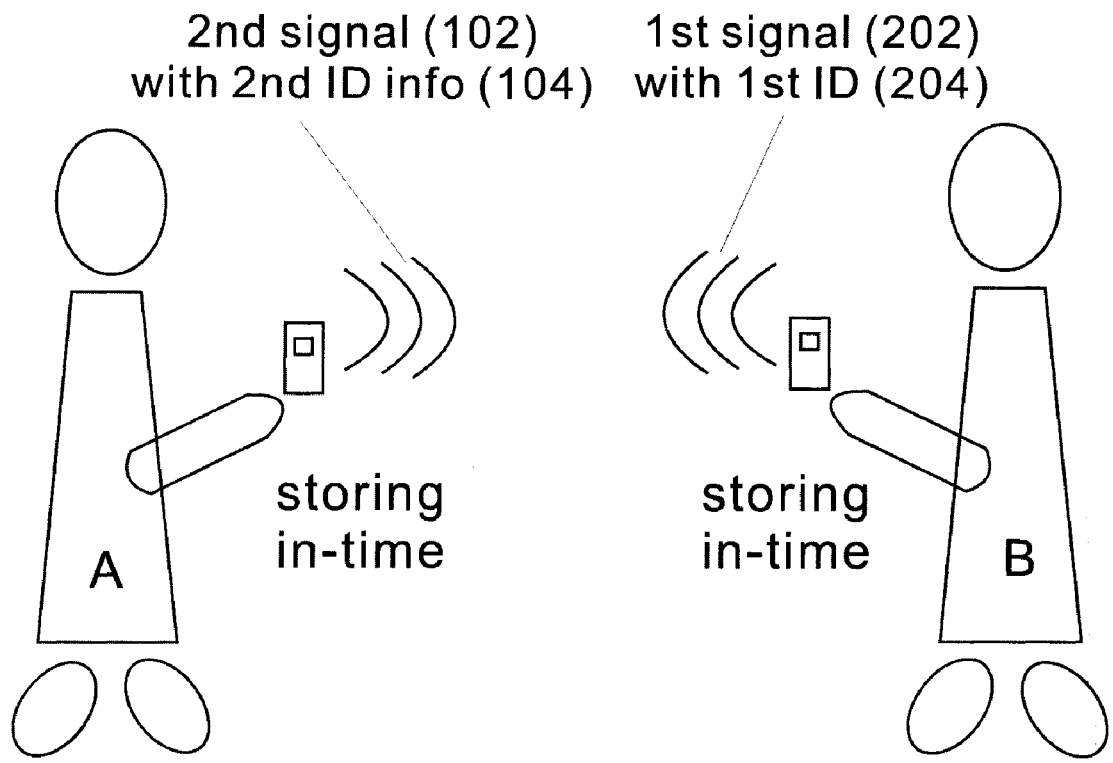
FIGS. 3a and 3b illustrate another operation of the device of FIG. 1.
Figure 3B:
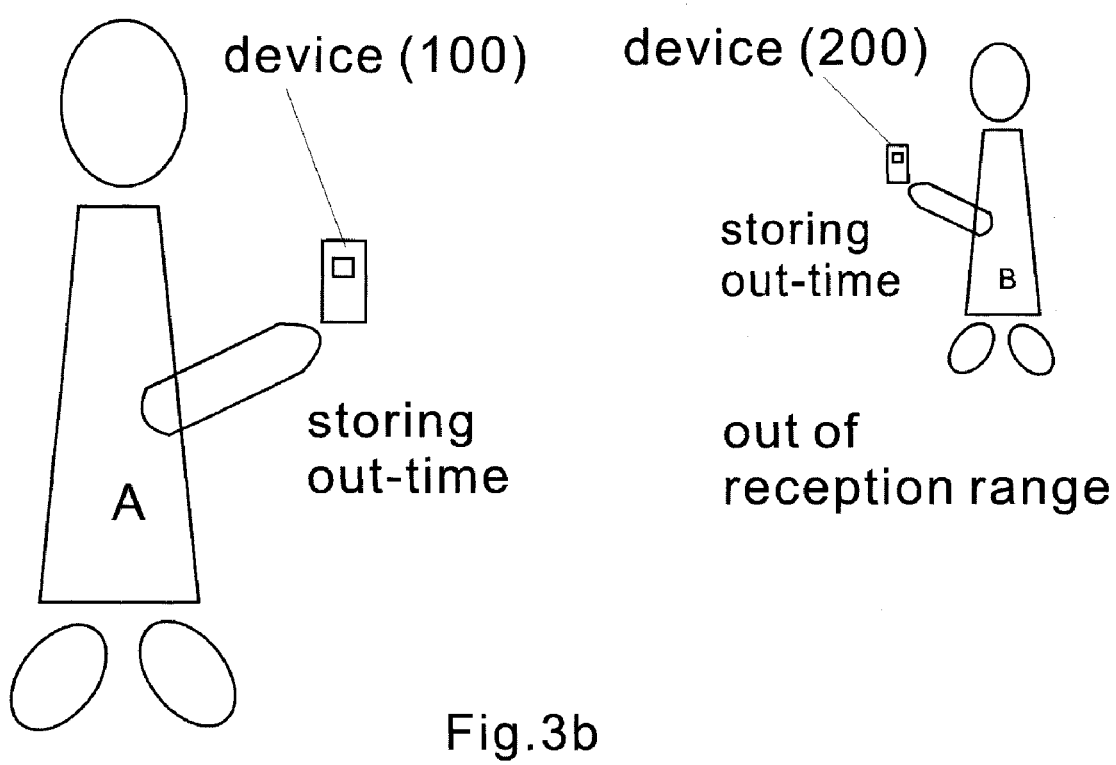

As shown in FIGS. 3a and 3b, in another embodiment, party B also monitors the time it spends with party A at the same time. The RF transceiver 110 of party A also transmits a second signal 102 containing a second identification information 104, which identifies the device 100. The signal source 200 of party B, which is similar to device 100, includes a RF transceiver 210 which, in addition to transmitting the first signal 202, also receives the second signal 102 when the device 100 is within the receivable range. To save the power consumption, the transceiver 210 transmits signals regularly upon a pre-defined time interval, for example, every 10 second.

The processing unit 220 of the signal source 200 reads and matches the second identification information 104 with pre-defined identification information contained in the memory means 230. When a match is found, the memory means store the in-time provided by the time means 240 with respect to the second identification information 104 of the device 100.

When party A is out of the radio frequency range, the RF transceiver 210 stops receiving the second signal 102 from the device 100. The moment the processing unit 220 no longer reads the second identification information 104, the processing unit 220 stores the out-time provided by the time means 240 with respect to the second identification information 104 in the memory means 230. In this embodiment, the in-time and out-time, and the engagement time duration are mutually recorded and monitored by both devices 100, 200 of party A and party B.

In another embodiment, party B may be a venue such as a shop (shop B). If party A has stored the identification information of shop B in the memory means 130, party A can monitor the time it spends in shop B. If the device 200 of shop B has the identification information of party A stored in the memory means 230, in addition to monitoring the time party A spent in shop B, it may also display certain advertisements or print out coupon specially selected for party A upon its arrival.

The time data collected by the device 100 may be uploaded to a computer for further manipulating the cumulative time spent with a party in a certain time period by the user to review or plan the social lives. The time data may also be uploaded to some Internet based application server to be displayed to the user on a webpage, of which the Internet based application also allows users to connect and share information from the webpage.

Figure 4:
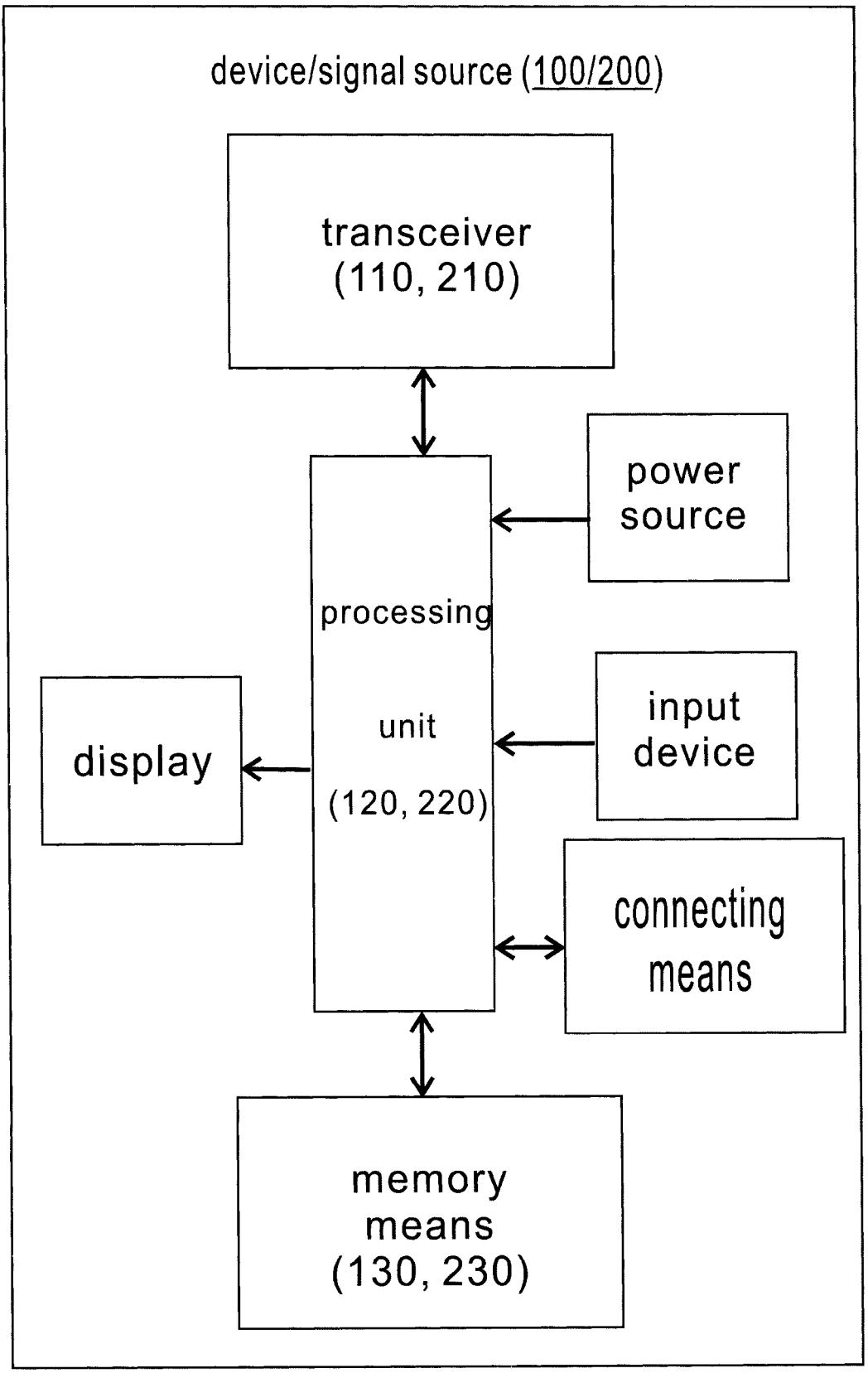
FIG. 4 illustrates another embodiment of the device of the present invention.

In another embodiment as shown in FIG. 4, the processing unit 120, 220 of the device 100 of party A or the signal source 200 of party B may function as a timing means and times the duration between when the RF transceiver 110, 220 starts receiving the first signal 202 or the second signal 102 (that is, when the processing unit 120, 220 matches the first or second identification information 204, 104 with the pre-defined information stored in the memory means 130, 230) and when the first signal 202 or the second signal 102 is out of the radio frequency range and is no longer received by the RF transceiver 110, 210. The processing unit 120, 220 may, for example, provide a counting signal to count the engagement time duration. The engagement time duration is then stored in the memory means 130, 230 with respect to the first or second identification information 204, 104.

Figure 5:
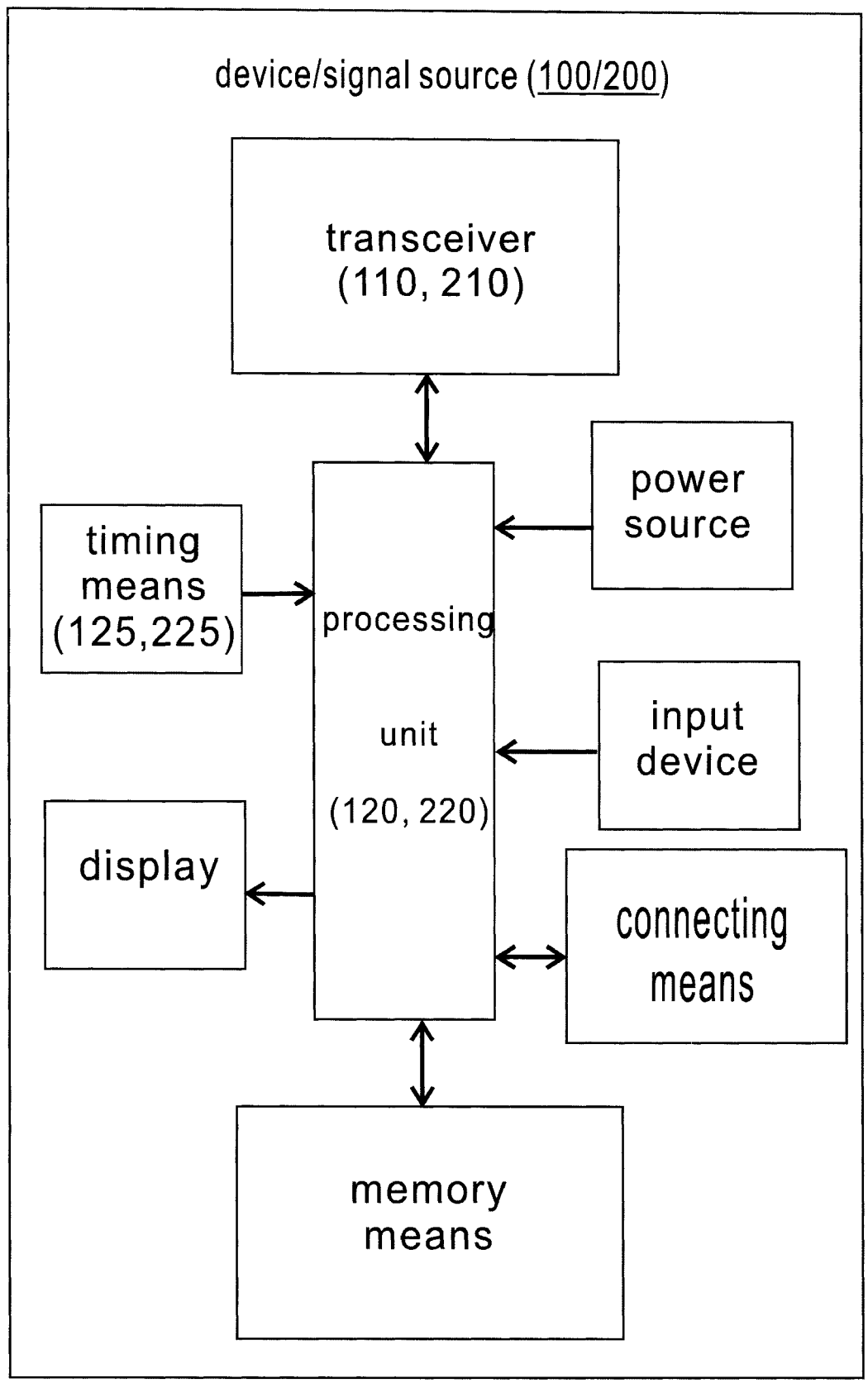
FIG. 5 illustrates another embodiment of the device of the present invention.

As shown in FIG. 5, in another embodiment, the timing means 125, 225 is a separate counter unit connected to the processing unit 120, 220 for timing the duration between when the RF transceiver 110, 220 starts receiving the first signal 202 or the second signal 102 and when the first signal 202 or the second signal 102 is no longer received by the RF transceiver 110, 210.

Figure 6:
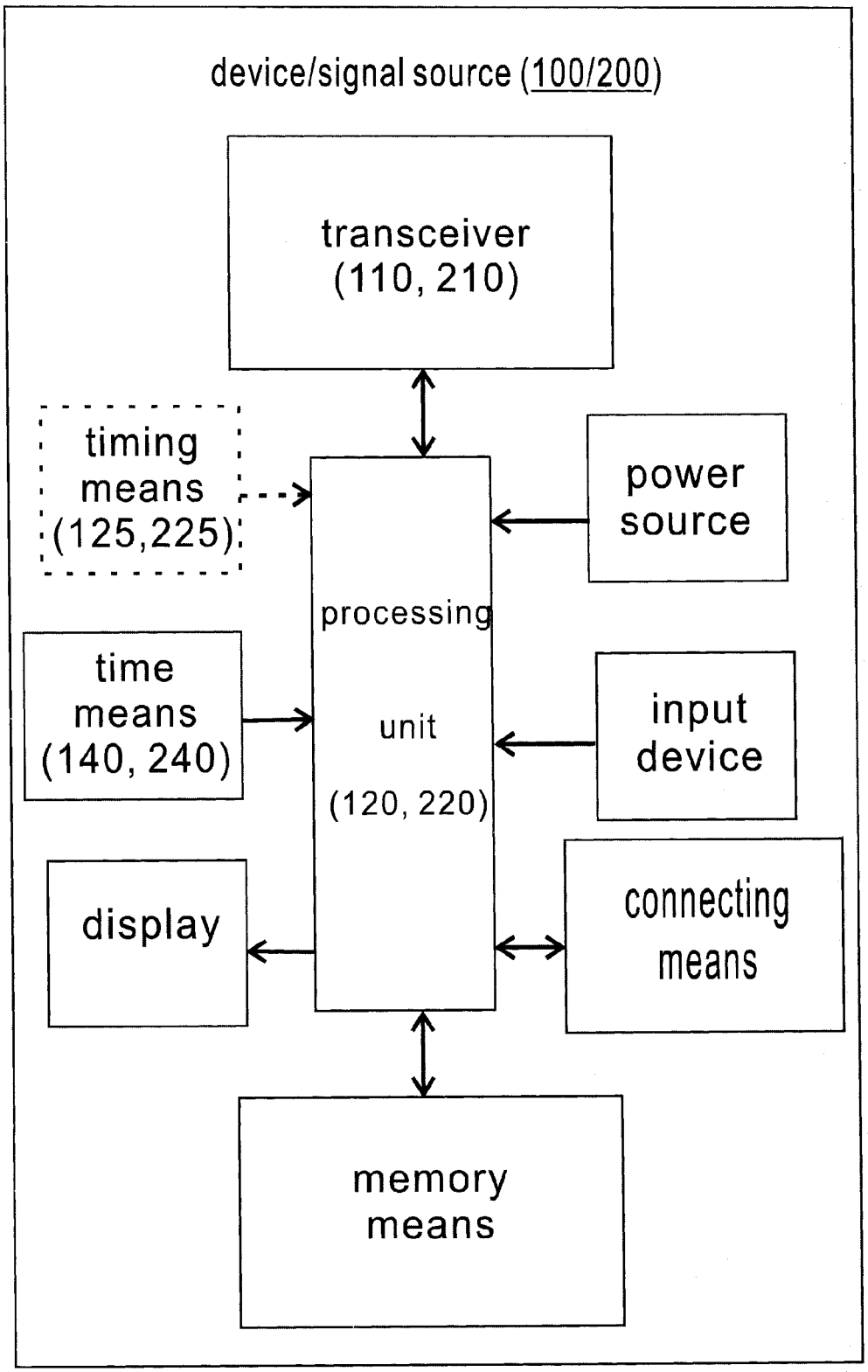
FIG. 6 illustrates another embodiment of the device of the present invention.

In the above two embodiments, without a time means, the time when the engagement occurs between party A and party B will not be recorded, but only the duration of the engagement is recorded. In another embodiment as shown in FIG. 6, the time means 140, 240, for example, a separate circuit or a digital clock device, is connected to the processing unit 120, 220 to indicate the time when the RF transceiver 110 starts receiving the first signal 202 and/or when the first signal 202 is no longer received by the RF transceiver 110. The starting or the ending engagement time may then be determined and recorded with respect to the engagement time duration.

While the invention has been described in detail with reference to disclosed embodiments, various modifications within the scope of the invention will be apparent to those of ordinary skill in this technological field. It is to be appreciated that features described with respect to one embodiment typically may be applied to other embodiments.

What is claimed is:

1. A method for monitoring engagement time in daily life, comprising:
    receiving a first radio frequency signal from a first signal source containing a first identification information of the first signal source;
    matching the first identification information with pre-defined identification information which is processed by a processing unit;
    storing in-time of the said first radio frequency signal with respect to the first identification information;
    checking the existence of the first radio frequency signal;
    storing the out-time when the first radio frequency signal is out of range,
    whereby the engagement time duration between the in-time and the out-time with respect to the first identification information can be computed.

2. The method as recited in claim 1, further comprising:
    transmitting a second radio frequency signal containing a second identification information from a second signal source;
    receiving the second radio frequency signal by the first signal source;
    matching the second identification information with pre-defined identification information;
    storing in-time of the said second radio frequency signal with respect to the second identification information;
    checking the existence of the second radio frequency signal;
    storing the out-time when the second radio frequency signal is out of range,
    whereby the engagement time duration between the in-time and the out-time with respect to the second identification information can be computed.

3. The method as recited in claim 1, further comprising:
    computing the engagement time duration between the in-time and the out-time with respect to the first identification information.

4. The method as recited in claim 2, further comprising:
    computing the engagement time duration between the in-time and the out-time with respect to the second identification information.

5. The method as recited in claim 1, wherein the first radio frequency signal is transmitted regularly upon a pre-defined time interval.

6. The method as recited in claim 1, wherein the existence of the first radio frequency signal is checked regularly upon a pre-defined time interval.

7. The method as recited in claim 2, wherein the second radio frequency signal is transmitted regularly upon a pre-defined time interval.

8. The method as recited in claim 2, wherein the existence of the second radio frequency signal is checked regularly upon a pre-defined time interval.

9. The method as recited in claim 1, further comprising:
providing marketing information to the first signal source.

10. A device for monitoring engagement time in daily life comprising:
a radio frequency transceiver adapted to receive from a first signal source a first radio frequency signal containing a first identification information of the first signal source;
a processing unit adapted to read the first identification information and match the first identification information with pre-defined identification information;
a time means for providing the time to be stored;
a power source;
a memory means adapted to store the in-time with respect to the first radio frequency signal and the first identification information when the radio frequency transceiver receives the said first radio frequency signal, and the out-time with respect to the first identification information when the radio frequency transceiver no longer receives the first radio frequency signal; and
a connecting means for connecting to an external processing unit for transferring data between the said device and the external processing unit,
whereby the engagement time duration between the in-time and the out-time with respect to the first identification information can be computed.

11. The device as recited in claim 10, wherein the radio frequency transceiver is adapted to transmit a second radio frequency signal containing a second identification information of the said device to the first signal source.

12. The device as recited in claim 11, wherein the second identification information is matched by the first signal source with pre-defined identification information, the in-time with respect to the said second radio frequency signal and the second identification information are stored by the first signal source when the second radio frequency signal is received by the first signal source.

13. The device as recited in claim 12, wherein the out-time with respect to the second identification information is stored by the first signal source when the second radio frequency signal is no longer received by the first signal source.

14. The device as recited in claim 10, wherein the processing unit is adapted to regularly read and match the first identification information with pre-defined identification information upon a pre-defined time interval.

15. The device as recited in claim 11, wherein the second radio frequency signal is transmitted regularly upon a pre-defined time interval.

16. The device as recited in claim 10, further comprising a display for displaying information, wherein said information is selected from the group comprising time, date, name, venue and event.

17. A method for monitoring engagement time in daily life, comprising:
receiving a first radio frequency signal from a first signal source containing a first identification information of the first signal source;
matching the first identification information with pre-defined identification information which is processed by a processing unit;
timing the engagement time duration between when the receiving of the said first radio frequency signal starts and the when the first radio frequency signal is no longer received;
storing the engagement time duration with respect to the first identification information.

18. The method as recited in claim 17, further comprising:
transmitting a second radio frequency signal containing a second identification information from a second signal source;
receiving the second radio frequency signal by the first signal source;
matching the second identification information with pre-defined identification information;
timing the engagement time duration between when the receiving of the second radio frequency starts and when the second radio frequency signal is no longer received;
storing the engagement time duration with respect to the second identification information.

19. The method as recited in claim 17, further comprising: checking the existence of the first radio frequency signal.

20. The method as recited in claim 18, further comprising: checking the existence of the second radio frequency signal.

21. The method as recited in claim 17, wherein the first radio frequency signal is transmitted regularly upon a pre-defined time interval.

22. The method as recited in claim 19, wherein the existence of the first radio frequency signal is checked regularly upon a pre-defined time interval.

23. The method as recited in claim 18, wherein the second radio frequency signal is transmitted regularly upon a pre-defined time interval.

24. The method as recited in claim 20, wherein the existence of the second radio frequency signal is checked regularly upon a pre-defined time interval.

25. The method as recited in claim 17, further comprising: providing marketing information to the first signal source.

26. A device for monitoring engagement time in daily life comprising:
a radio frequency transceiver adapted to receive from a first signal source a first radio frequency signal containing a first identification information of the first signal source;
a processing unit adapted to read the first identification information and match the first identification information with pre-defined identification information;
a timing means for measuring the engagement time duration between the radio frequency transceiver starts receiving the said first radio frequency signal and the radio frequency transceiver no longer receives the first radio frequency signal;
a power source;
a memory means adapted to store the engagement time duration with respect to the first identification information; and
a connecting means for connecting to an external processing unit for transferring data between the said device and the external processing unit.

27. The device as recited in claim 26, further comprising:
a time means for providing the time when the radio frequency transceiver starts receiving the said first radio frequency signal or when the radio frequency transceiver no longer receives the first radio frequency signal, whereby the starting time or the ending time of the engagement can be recorded.

28. The device as recited in claim 26, wherein the radio frequency transceiver is adapted to transmit a second radio frequency signal containing a second identification information of the said device to the first signal source.

29. The device as recited in claim 28, wherein the second identification information is matched by the first signal source with pre-defined identification information, the engagement time duration between when the first signal source starts receiving the said second radio frequency signal and when the second radio frequency is no longer received by the first signal source is recorded.

30. The device as recited in claim 26, wherein the processing unit is adapted to regularly read and match the first identification information with pre-defined identification information upon a pre-defined time interval.

31. The device as recited in claim 28, wherein the second radio frequency signal is transmitted regularly upon a pre-defined time interval.

32. The device as recited in claim 26, further comprising a display for displaying information, wherein said information is selected from the group comprising time, date, name, venue and event.

33. A device for monitoring engagement time in daily life comprising:
   a radio frequency transceiver adapted to receive from a first signal source a first radio frequency signal containing a first identification information of the first signal source;
   a processing unit adapted to read the first identification information and match the first identification information with pre-defined identification information, and measure the engagement time duration between the radio frequency transceiver starts receiving the said first radio frequency signal and the radio frequency transceiver no longer receives the first radio frequency signal;
   a power source;
   a memory means adapted to store the engagement time duration with respect to the first identification information; and
   a connecting means for connecting to an external processing unit for transferring data between the said device and the external processing unit.

34. The device as recited in claim 33, further comprising:
   a time means for providing the time when the radio frequency transceiver starts receiving the said first radio frequency signal or when the radio frequency transceiver no longer receives the first radio frequency signal,
   whereby the starting time or the ending time of the engagement can be recorded.

35. The device as recited in claim 33, wherein the radio frequency transceiver is adapted to transmit a second radio frequency signal containing a second identification information of the said device to the first signal source.

36. The device as recited in claim 35, wherein the second identification information is matched by the first signal source with pre-defined identification information, the engagement time duration between when the first signal source starts receiving the said second radio frequency signal and when the second radio frequency is no longer received by the first signal source is recorded.

37. The device as recited in claim 33, wherein the processing unit is adapted to regularly read and match the first identification information with pre-defined identification information upon a pre-defined time interval.

38. The device as recited in claim 35, wherein the second radio frequency signal is transmitted regularly upon a pre-defined time interval.

39. The device as recited in claim 33, further comprising a display for displaying information, wherein said information is selected from the group comprising time, date, name, venue and event.

* * * * *